United States Patent [19]

Ito et al.

[11] Patent Number: 4,605,976
[45] Date of Patent: Aug. 12, 1986

[54] RECORDING AND/OR REPRODUCING SYSTEM FOR A 4-HEAD TYPE RECORDING AND/OR REPRODUCING APPARATUS

[75] Inventors: Takeyoshi Ito; Masahiko Tsuruta, both of Yokohama, Japan

[73] Assignee: Victor Company of Japan, Ltd., Yokohama, Japan

[21] Appl. No.: 612,690

[22] Filed: May 22, 1984

[30] Foreign Application Priority Data

May 24, 1983 [JP] Japan .................................. 58-91372

[51] Int. Cl.⁴ ............................................. G11B 21/04
[52] U.S. Cl. ......................................... 360/70; 360/73
[58] Field of Search ...................... 360/70, 73, 84, 64, 360/27

[56] References Cited

U.S. PATENT DOCUMENTS

4,322,757 3/1982 Hatakeyama .......................... 360/70
4,328,518 5/1982 Kawata et al. ........................ 360/64
4,490,755 12/1984 Tokuyama ............................ 360/70

*Primary Examiner*—Raymond F. Cardillo
*Assistant Examiner*—Steven R. Garland
*Attorney, Agent, or Firm*—Michael N. Meller

[57] ABSTRACT

A recording and/or reproducing system for a 4-head type recording and/or reproducing apparatus, comprises a circuit for recording a head discriminating information signal of each of the four heads during the recording, a circuit for reproducing this head discriminating information signal during the reproduction, and a circuit for controlling the rotational phase of the heads so that the recorded tracks on the magnetic tape are reproduced by the same heads which recorded these tracks at the time of the recording. In addition, a magnetic tape having such a discriminating signal recorded thereon, can be played in a conventional 2-head recording and/or reproducing apparatus.

7 Claims, 52 Drawing Figures

RECORDING AND/OR REPRODUCING SYSTEM FOR A 4-HEAD TYPE RECORDING AND/OR REPRODUCING APPARATUS

BACKGROUND OF THE INVENTION

The present invention generally relates to recording and/or reproducing systems for 4-head type recording and/or reproducing apparatuses, and more particularly to a recording and/or reproducing system for a 4-head type recording and/or reproducing apparatus which carries out a recording and/or a reproduction by successively switching four magnetic heads which are mounted on a rotary body with a 90° angular separation from each other, which recording and/or reproducing system enables reproduction by the same magnetic heads which have recorded each of the tracks on a magnetic tape.

A 4-head type recording and/or reproducing apparatus is disclosed in the specification of a U.S. patent application Ser. No. 552,721 entitled "RECORDING-/REPRODUCED SIGNAL SWITCHING SYSTEM FOR A 4-HEAD TYPE RECORDING AND REPRODUCING APPARATUS" filed Nov. 17, 1983, in which the assignee is the same as the assignee of the present application. As will be described later on in the specification in conjunction with the drawings, this 4-head type recording and/or reproducing apparatus successively records a video signal on a magnetic tape which is obliquely wrapped around the peripheral surface of a drum over an angular range of approximately 270°, by use of four magnetic heads which are mounted on a rotary body of the drum with a 90° angular separation from each other. At the time of the reproduction, the video signal is successively reproduced from the magnetic tape by these four magnetic heads. The magnetic tape having the video signal recorded thereon by these four magnetic heads, is also playable on a conventional and normal 2-head type recording and/or reproducing apparatus. In other words, the magnetic tape which is recorded by one of the 2-head type and 4-head type recording and/or reproducing apparatuses, can be played compatibly on the other of the 2-head type and 4-head type recording and/or reproducing apparatuses.

In the 4-head type recording and/or reproducing apparatus, the four magnetic heads are made up of a first pair of magnetic heads and a second pair of magnetic heads. The first pair of magnetic heads are mounted at mutually opposite positions on the rotary body, and each have a first azimuth angle. On the other hand, the second pair of magnetic heads are mounted at mutually opposite positions on the rotary body, separated from the respective first pair of magnetic heads by an angular separation of 90°, and each have a second azimuth angle. At the time of the reproduction, the tracks on the magnetic tape which were recorded by the magnetic head having the first azimuth angle, are reproduced by the magnetic head having the first azimuth angle. Similarly, the tracks on the magnetic tape which are recorded by the magnetic head having the second azimuth angle, are reproduced by the magnetic head having the second azimuth angle. However, even when reproducing the track by the magnetic head having the same azimuth angle as the magnetic head which recorded that track, the track which was recorded by one of the pair of magnetic heads having the same azimuth angle may be reproduced by the other of the same pair of magnetic heads.

On the other hand, even between the magnetic heads having the same azimuth angle, the magnetic heads do not have exactly the same characteristic because of the inconsistencies introduced when the magnetic heads are manufactured. In other words, the magnetic heads having the same azimuth angle, actually have characteristics which differ within an allowable range. Accordingly, there is a problem that an optimum reproduced output cannot be obtained when the track which was recorded by one of the pair of magnetic heads having the same azimuth angle, is reproduced by the other of the same pair of magnetic heads.

SUMMARY OF THE INVENTION

Accordingly, it is a general object of the present invention to provide a novel and useful recording and/or reproducing system for a 4-head type recording and/or reproducing apparatus, in which the problems described heretofore have been eliminated.

Another and more specific object of the present invention is to provide a recording and/or reproducing system for a 4-head type recording and/or reproducing apparatus, which controls the phase of magnetic heads during a reproduction so that a track which was recorded by a magnetic head at the time of a recording is scanned by the same magnetic head, by recording a discriminating information signal of each of the magnetic heads during at the time of the recording and reproducing the discriminating information signal during the reproduction. According to the system of the present invention, the track which was recorded by a magnetic head at the time of the recording, is scanned by the same magnetic head during the reproduction. For this reason, even when there are inconsistencies in the characteristics of the four magnetic heads, it is possible to obtain a reproduced output having an optimum signal-to-noise ratio.

Still another object of the present invention is to provide a recording and/or reproducing system for a 4-head type recording and/or reproducing apparatus, in which a discriminating signal for discriminating each of the magnetic heads, is recorded onto a control track by a control head, together with a control signal, at the time of the recording. The discriminating signal is reproduced from the control track by the control head, together with the control signal, during the reproduction. According to the system of the present invention, a track which was recorded by a magnetic head at the time of the recording, is scanned by the same magnetic head during the reproduction by use of the discriminating signal. In addition, a magnetic tape having such a discriminating signal recorded thereon, can be played in the conventional 2-head type recording and/or reproducing apparatus without introducing problems, as if it were a magnetic tape having no such discriminating signal recorded thereon.

Other objects and further features of the present invention will be apparent from the following detailed description when read in conjunction with the accompanying drawings.

BRIEF DESCRIPTION OF THE DRAWINGS

FIGS. 7(A) through 7(I) show signal waveforms at each part of the block system shown in FIG. 6;

FIGS. 9(A) through 9(J) show signal waveforms at each part of the block system shown in FIG. 8;

FIGS. 11(A) through 11(I) show signal waveforms at each part of the block system shown in FIG. 10.

DETAILED DESCRIPTION

Figure 1:
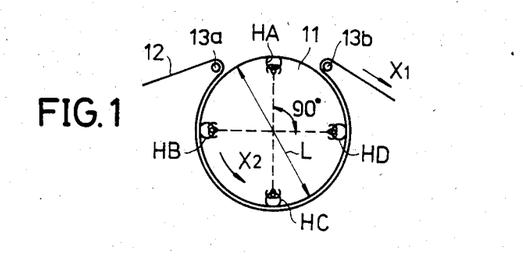
FIG. 1 shows an example of an arrangement of heads in a 4-head helical scan type recording and/or reproducing apparatus which is applied with a recording

First, description will be given with respect to the arrangement of heads, scanning loci of the heads, and the like, in a recording and/or reproducing apparatus (VTR) which is applied with a recording and/or reproducing system according to the present invention. In FIG. 1, a rotary body 11 which may assume the form of a rotary drum or a rotary plate, for example, has a diameter L. This diameter L of the rotary drum 11, is selected to $\frac{2}{3}$ the diameter of the rotary drum in the existing 2-head helical scan type recording and/or reproducing apparatus (VTR). The rotary body 11 is rotated counterclockwise (the direction indicated by an arrow $X_2$) at a rotational speed (45 rps, for example) which is related to the field frequency of a video signal which is to be recorded and reproduced, by a motor (not shown). Recording and reproducing magnetic heads (video heads) HA, HB, HC, and HD are equally spaced apart and mounted on the rotary body 11, so that adjacent video heads are spaced apart by 90°. The video heads HA and HC have gaps of the same azimuth angle, and the video heads HB and HD have gaps of the same azimuth angle. The video heads HA and HB have gaps of mutually different azimuth angles.

By taking into account the angle required to carry out an overlap recording, a magnetic tape 12 is guided by guide poles 13a and 13b and is wrapped obliquely around the peripheral surface of the rotary body 11 over an angular range which is greater than 270° but less than 360°. This angular range over which the tape 12 is wrapped around the peripheral surface of the rotary body 11, is selected so as not to interfere with the tape travel, and so that the tape 12 can be loaded automatically. The diameter L of the rotary drum 11 is equal to $\frac{2}{3}$ the diameter of the rotary body in the existing 2-head type VTR, and is small. The tape 12 is driven in a state where the tape 12 is pinched between a capstan (not shown) and a pinch roller (not shown), to travel in the direction of an arrow $X_1$. The traveling speed of the tape 12 is selected so that the tape 12 travels by one track pitch while one of the video heads HA, HB, HC, and HD rotates by an angle which is slightly larger than 270° at a rotational speed of 45 rps.

Accordingly, the length of the tape 12 which is in contact with the peripheral surface of the rotary body 11, is equal to the length of the tape which is in contact with the peripheral surface of the rotary body in the existing 2-head type VTR. As a result, the loci of video tracks which are formed on the tape 12, is identical to the loci of the video tracks which are formed in the existing 2-head type VTR. In addition, the relative linear speed between the tape and the head, is identical to the relative linear speed obtained in the existing 2-head type VTR. A video signal having a field frequency of 60 Hz (or 59.94 Hz) is successively recorded at a rate of one field in one track, as will be described later on in the specification, and the resulting tape pattern on the tape 12 is identical to the tape pattern which is obtained in the existing 2-head type VTR so as to ensure perfect tape compatibility between the 4-head type VTR which is applied with the system according to the present invention and the existing 2-head type VTR.

When recording or reproducing a video signal having a field frequency of 50 Hz at a rate of one field in one track, it is obvious that the rotary body 11 is rotated at a rotational speed of 37.5 rps.

Figure 2:
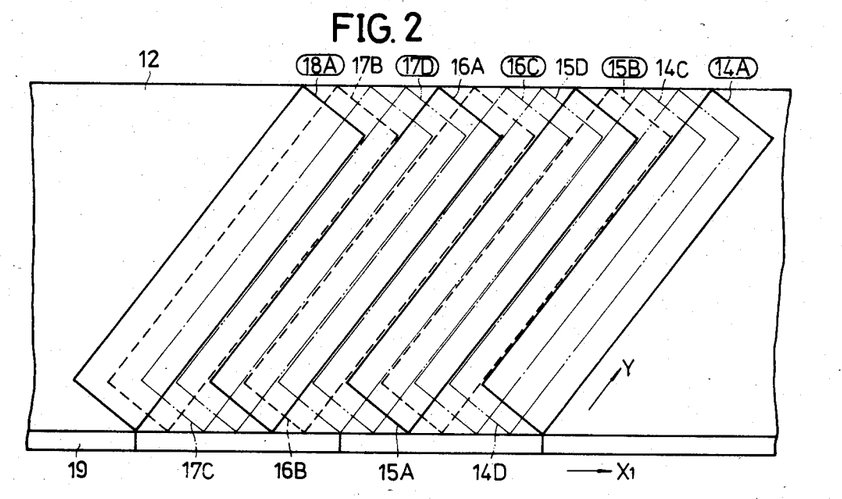
FIG. 2 shows a tape pattern on a tape, illustrating scanning loci of the heads shown in FIG. 1.

The scanning loci of the four video heads HA, HB, HC, and HD in the 4-head type VTR described heretofore, are shown in FIG. 2. As clearly seen from FIG. 2, the scanning loci of the four video heads HA, HB, HC, and HD are different from the scanning loci of the two video heads in the existing 2-head type VTR. If the video head HA assumes a location near the guide pole 13a and starts to scan over the tape 12, a scanning locus indicated by a solid line 14A in FIG. 2 begins to be formed. When the video head HA scans over approximately $\frac{1}{3}$ the scanning locus 14A, the video head HD which lags the video head HA by 90° with respect to the rotating direction of the rotary body 11 starts to make contact with the tape 12. Further, when the video head HA scans over $\frac{2}{3}$ the scanning locus 14A, the video head HC starts to make contact with the tape 12. At a point when the video head HA completes scanning over the scanning locus 14A, the video head HB starts to make contact with the tape 12. Accordingly, as the video head HA scans over the scanning locus 14A, the video head HD scans over a scanning locus indicated by a two-dot chain line 14D in FIG. 2 with a predetermined time lag, and the video head HC scans over a scanning locus indicated by a one-dot chain line 14C in FIG. 2 with a further predetermined time lag. The video head HB starts to scan over a scanning locus indicated by a broken line 15B at the point when the video head HA completes scanning over the scanning locus 14A.

Similarly thereafter, scanning loci 15A, 15D, 16C, 16B, 16A, 17D, 17C, 17B, 18A, . . . are successively formed in this sequence by the heads HA, HB, HC, and HD. In FIG. 2, the track width of each of the tracks are illustrated as being equal to the track pitch, for convenience' sake. In addition, a control track 19 is formed along the longitudinal direction of the tape 12. For example, a control pulse is recorded on this control track 19 with a period which is equal to two fields.

Figure 3:
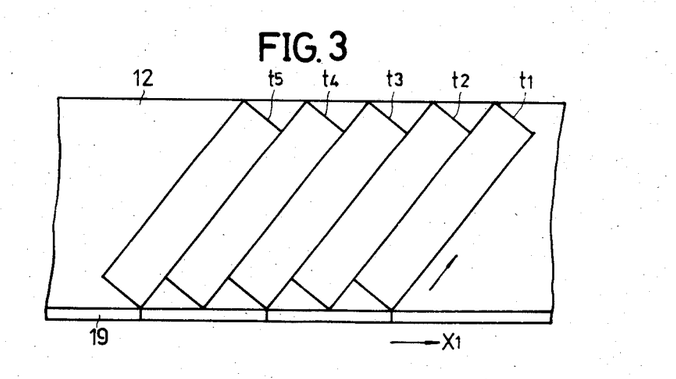
FIG. 3 shows a tape pattern in which the tracks are formed by the heads shown in FIG. 1.

In order to form a tape pattern which is identical to the tape pattern shown in FIG. 3 which is formed by the existing 2-head type VTR, the video signal is only supplied to the video heads which are scanning over the scanning loci 14A, 15B, 16C, 17D, 18A, . . . . The reference numerals of these scanning loci 14A, 15B, 16C, 17D, 18A, ... are encircled in FIG. 2. As a result, a track $t_1$ shown in FIG. 3 is formed by the head HA. Similarly, by switching the recording head in a sequence HB→HC→HD→HA→... for every period which is approximately equal to one field, video tracks $t_2$, $t_3$, $t_4$, $t_5$, ... are formed in this sequence.

Hence, during the recording mode of the 4-head type VTR, the video signal must be successively switched and supplied to one of the four heads HA, HB, HC, and HD. Further, during the reproducing mode of the 4-head type VTR, the reproduced signals from the heads HA, HB, HC, and HD must successively be switched so as to obtain only one reproduced signal from one of the heads HA, HB, HC, and HD at one time.

The magnetic tape 12 is thus recorded with a tape pattern such that the magnetic tape 12 can be played compatibly on the existing 2-head type VTR. In FIGS. 2 and 3, the illustration of an audio track is omitted. However, an audio track is formed by an audio head, in the longitudinal direction of the magnetic tape 12 along the upper edge thereof, for example.

On the other hand, during the reproduction, the video tracks $t_1$ through $t_5$ and the like shown in FIG. 3 are reproduced under the control of a servo circuit, by a video head having a gap of the same azimuth angle as the gap of the video head which recorded the video tracks.

The magnetic tape 12 which is recorded with the 4-head type VTR described heretofore and has the tape pattern shown in FIG. 3, may be played on the same 4-head type VTR. In this case, the control pulse having a period of one frame, which is the same as the control signal employed in the existing 2-head type VTR, is recorded on the control track 19 on the magnetic tape 12. Hence, a capstan servo operation and the like are carried out base on the control pulse which is reproduced from the control track 19. As a result, the video tracks are successively reproduced by the video heads having gaps of the same azimuth angles as the respective video heads which recorded the video tracks. In the 4-head type VTR, however, there are two pairs of video heads (that is, the heads HA and HC and the heads HB and HD) and each pair is made up of video heads having gaps of the same azimuth angle. On the other hand, the control pulse is reproduced from the control track 19 with a period of one frame. For this reason, when playing a magnetic tape by the same 4-head type VTR which recorded this magnetic tape, the video tracks are reproduced by the video heads having gaps of the same azimuth angles as the gaps of the video heads which recorded the video tracks, but the video tracks are not necessarily reproduced by the same video heads which recorded the video tracks. In other words, the video tracks may be reproduced by the video heads which did not record the video tracks, depending on the relative positions of the rotary body 11 and the magnetic tape 12 when the reproduction is started. For example, the video track $t_1$ is recorded by the head HA, but this video track $t_1$ is not necessarily reproduced by the head HA and may be reproduced by the head HC which has the gap of the same azimuth angle as the gap of the head HA. Similarly, the video track $t_2$ is recorded by the head HB, but this video track $t_2$ is not necessarily reproduced by the head HB and may be reproduced by the head HD which has the gap of the same azimuth angle as the gap of the head HB. Further, the video track $t_3$ recorded by the head HC may be reproduced by the head HA, and the video track $t_4$ recorded by the head HD may be reproduced by the head HB.

Even when the video track $t_1$ recorded by the head HA is reproduced by the head HC, for example, the video signal can be reproduced from the video track $t_1$ satisfactorily because the heads HA and HC have gaps of the same azimuth angle. However, although these heads HA and HC have gaps of the same azimuth angle, the characteristics of these heads HA and HC are not identical due to inconsistencies introduced when these heads HA and HC are manufactured. Normally, the characteristics of the heads HA and HC having gaps of the same azimuth angle differs within a predetermined allowable range. The same holds true for the heads HB and HD which have gaps of the same azimuth angle. Therefore, when playing a magnetic tape on the same 4-head type VTR which recorded this magnetic tape, it is desirable to reproduce the video tracks by the same video heads which recorded the video tracks, in order to obtain an optimum reproduced output. However, there was a problem in that the optimum reproduced output could not always be obtained, because the reproduction of a video track by the same video head which recorded this video track, was dependent on the relative positions of the rotary body 11 and the magnetic tape 12 when the reproduction is started, as described before.

Figure 4:
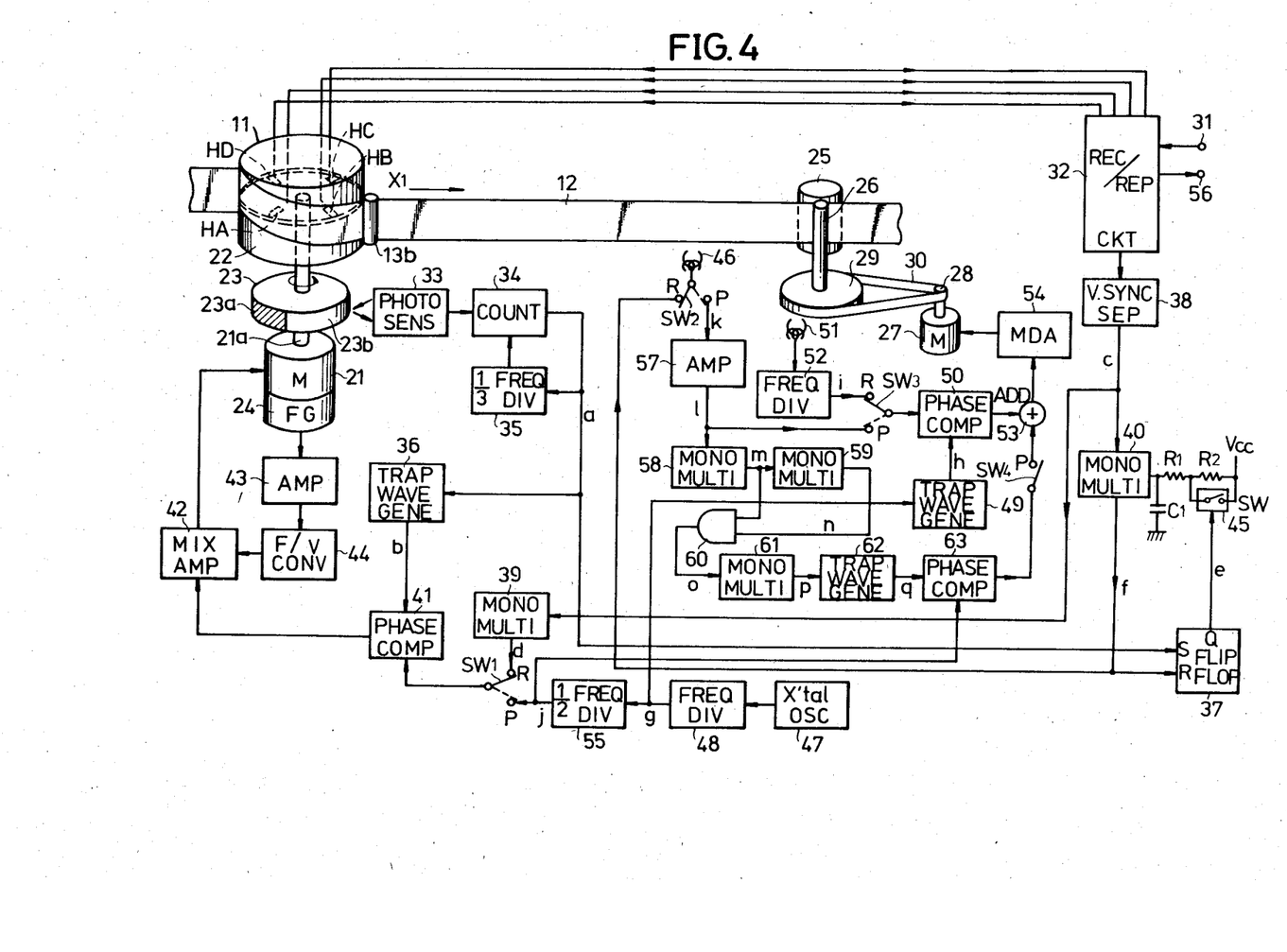
FIG. 4 is a systematic block diagram showing a first embodiment of a recording and/or reproducing system according to the present invention.

Accordingly, the recording and/or reproducing system according to the present invention was developed to eliminate the above problem. First, description will be given with respect to a first embodiment of a recording and/or reproducing system according to the present invention, by referring to FIG. 4. In FIG. 4, those parts which are the same as those corresponding parts in FIG. 1 are designated by the same reference numerals, and their description will be omitted. In FIG. 4, a head motor 21 has a rotary shaft 21a. The tip end of the rotary shaft 21a penetrates through a central part of a stationary drum 22, and is fixed to the central part of the rotary body (rotary drum in this case) 11. A disc 23 is fixed on the rotary shaft 21a, between the stationary drum 22 and the head motor 21. The video heads HA through HD are mounted on the bottom surface of the rotary body 11, and the bottom surface of the rotary body 11 and the upper surface of the stationary drum 22 are separated by a predetermined distance. A light absorbing part 23a is provided on the outer peripheral surface of the disc 23 over an angular range of 180°, and a light reflecting part 23b is provided on the outer peripheral surface of the disc 23 over the remaining angular range of 180°. A signal having a frequency which is proportional to the rotational speed of the head motor 21, is produced from a frequency generator (FG) 24.

As shown in FIG. 1, the magnetic tape 12 is wrapped around the outer peripheral surface of the rotary body 11 over an angular range which is slightly greater than 270°. Further, the magnetic tape 12 is pinched between a pinch roller 25 and a capstan 26. A belt is stretched across between a pulley 28 which is fixed on a rotary shaft of a capstan motor 27 and a flywheel 29 which is fixed to the capstan 26. The rotational force of the capstan motor 27 is transmitted to the capstan 26 through this belt 30. The capstan 26 rotates as the capstan motor 27 rotates. The magnetic tape 12 which is pinched between the pinch roller 25 and the capstan 26, is moved in the direction of an arrow X1 as the capstan 26 rotates.

Description will now be given with respect to the operation of the system during the recording mode. During the recording mode, switches SW1, SW2, and SW3 are connected to respective terminals R, and a switch SW4 is open. For example, a standard system color video signal which is to be recorded, is supplied to a recording/reproducing circuit 32 through an input terminal 31. The recording/reproducing circuit 32 converts the color video signal into a signal having a known signal format which is suited for magnetic recording and reproduction. The converted color video signal from the recording/reproducing circuit 32, is successively and selectively supplied to the video heads HA, HB, HC, and HD for every duration of one field (actually, this duration is slightly longer than one field because of the overlap recording). Thus, the video heads HA through HD successively form the video tracks in the tape pattern shown in FIG. 3.

Figure 5:
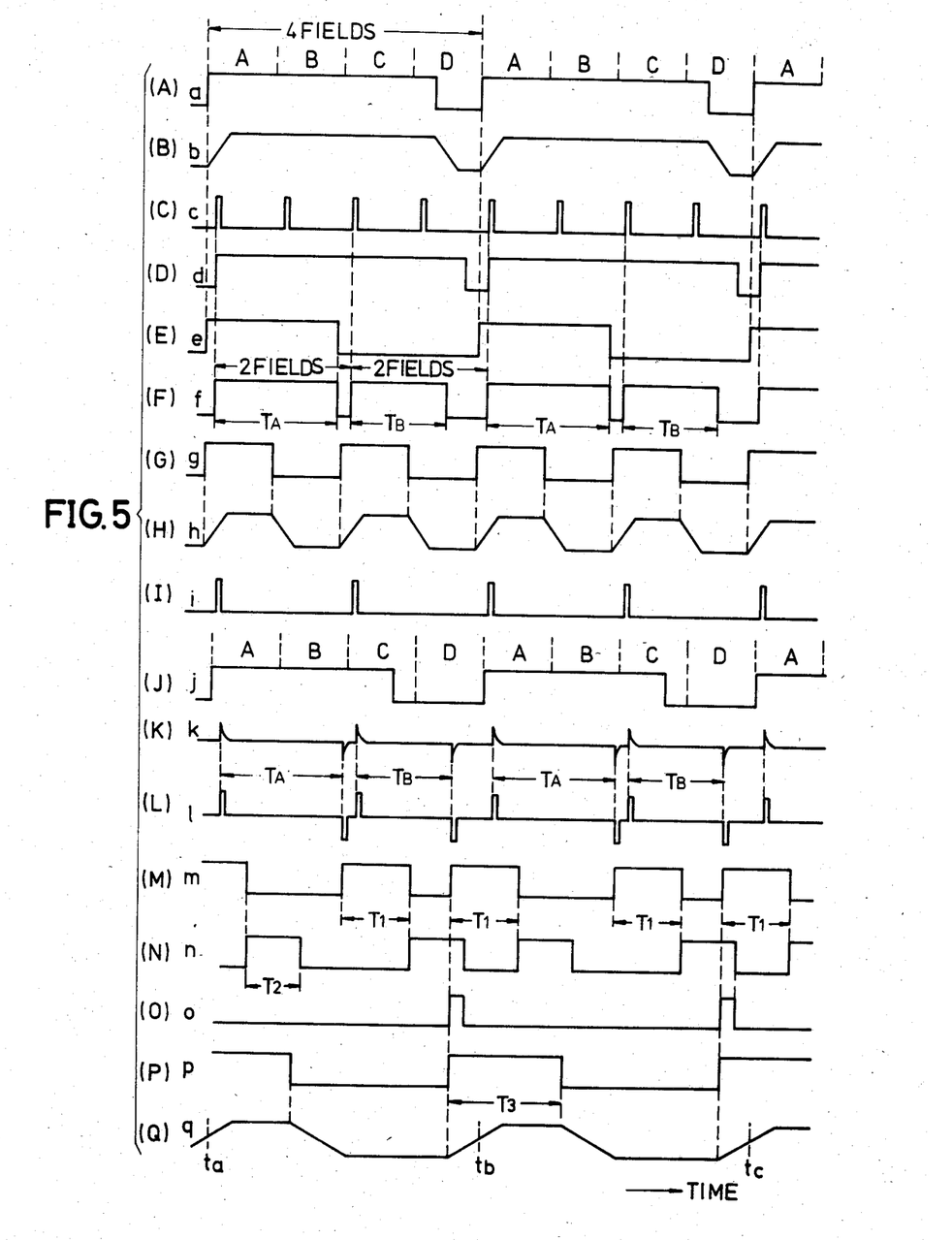
FIGS. 5(A) through 5(Q) show signal waveforms at each part of the block system shown in FIG. 4.

On the other hand, the rotary body 11, the head motor 21, and the disc 23 are rotated at a rotational speed such that they rotate over 270° in a duration which is 1/N times one field of the video signal which is to be recorded and reproduced, where N is a natural number. Description will hereinafter be given with respect to a case where the video signal to be recorded and reproduced has a field frequency of 60 Hz (59.94 Hz), and the rotary body 11, the head motor 21, and the disc 23 are rotated at a rotational speed of 45 rps. In this case, a square wave having a repetition frequency of 45 Hz and a duty cycle of approximately 50%, is obtained from a photosensor 33 and is supplied to a counter 34. An output pulse of the counter 34 is supplied to a ⅓-frequency divider 35. An output signal of this frequency divider 35 resets the counter 34. As a result, the counter 34 produces a pulse signal a shown in FIG. 5(A) having a repetition frequency of 15 Hz. In other words, in the pulse signal a, one pulse is produced for every one revolution of the rotary body 11, the head motor 21, and the like. For example, the rising edge of the pulse signal a coincides with a starting point when the video head HA starts to carry out the recording. In FIGS. 5(A) and 5(J), the reference characters "A" through "D" illustrated above the respective figures represent recording durations (of one field) or reproducing durations (of one field) of the respective video heads HA through HD.

The pulse signal a is supplied to a trapezoidal wave generating circuit 36 wherein the pulse signal a is converted into a trapezoidal wave b shown in FIG. 5(B). On the other hand, the pulse signal a is also supplied to a set terminal of a flip-flop 37, to set the flip-flop 37 by the rising edge thereof. A recording video signal is separated in a part of the recording/reproducing circuit 32, and a vertical synchronizing signal separating circuit 38 separates a vertical synchronizing signal c shown in FIG. 5(C) from the recording video signal. The vertical synchronizing signal c is supplied to monostable multivibrators 39 and 40, to trigger these monostable multivibrators 39 and 40 by the rising edge thereof. The time constant of the monostable multivibrator 39 is selected to a value which is greater than 1/20 second but smaller than 1/15 second. Accordingly, the monostable multivibrator 39 produces a pulse signal d shown in FIG. 5(D) which is in phase with the vertical synchronizing signal c and has a repetition frequency of 15 Hz. This pulse signal d is supplied as a reference signal to a phase comparator 41, through the switch SW1.

The phase comparator 41 is provided in a part of a phase control loop within a head servo circuit. The phase comparator 41 receives the trapezoidal wave b as a comparison signal and receives the pulse signal d as the reference signal, to sample and hold the sloping part of the trapezoidal wave b by the pulse signal d. A voltage produced from the phase comparator 41 as a result of the sample and hold operation, is supplied to a mixing amplifier 42 as a phase error voltage. On the other hand, the A.C. signal from the frequency generator 24, which is proportional to the rotational speed of the head motor 21, is supplied to a frequency-to-voltage (F/V) converter 44 through an amplifier 43. The A.C. signal is subjected to a frequency-to-voltage conversion in the F/V converter 44, and the F/V converter 44 supplies a speed error signal to the mixing amplifier 42. The mixing amplifier 42 mixes and amplifies the phase error voltage from the phase comparator 41 and the speed error signal from the F/V converter 44, and supplies an output signal to the head motor 21. Hence, the head motor 21 is controlled so that the rotational speed is kept constant at the rotational speed of 45 rps, and so that the rotational phase of the head motor 21 is also kept constant.

On the other hand, the monostable multivibrator 40 frequency-divides the vertical synchronizing signal c by ½, and applies an output signal to a reset terminal of the flip-flop 37 so as to reset this flip-flop 37. The flip-flop 37 is set by the rising edge of the pulse signal a, and a Q-output e of the flip-flop 37 assumes a high level responsive to the rising edge of the pulse signal a as shown in FIG. 5(E). A switching circuit 45 is turned OFF by the high-level Q-output e. In addition, the flip-flop 37 is reset by the trailing edge of the output of the monostable multivibrator 40, and the Q-output e of the flip-flop 37 assumes a low level. The switching circuit 45 is turned ON by the low-level Q-output e. The time constant of the monostable multivibrator 40 is determined by a circuit part comprising a capacitor C1, resistors R1 and R2, and the switching circuit 45. This time constant of the monostable multivibrator 40 assumes a large time constant $T_A$ which is determined by the resistors R1 and R2 and the capacitor C1 when the switching circuit 45 is OFF. On the other hand, both terminals of the resistor R2 are short-circuited when the switching circuit 45 is turned ON. Thus, the time constant of the monostable multivibrator 40 assumes a small time constant $T_B$ which is determined by the resistor R1 and the capacitor C1 only, when the switching circuit 45 is ON. The time constants $T_A$ and $T_B$ are both selected to a value which is greater than 1/60 second but smaller than 1/30 second, because of the need to frequency-divide the vertical synchronizing signal c by ½.

Accordingly, a pulse signal f shown in FIG. 5(F) is obtained from the monostable multivibrator 40. The pulse signal f has a pulse width $T_A$ from the rising edge of the vertical synchronizing signal which is recorded by the video head HA, and has a pulse width $T_B$ from the rising edge of the vertical synchronizing signal which is recorded by the video head HC, where the pulse width $T_A$ is greater than the pulse width $T_B$. The rising edge of the pulse signal f is in phase with the vertical synchronizing signal c and has a period of 1/30 second. The pulse signal f has a repetition frequency of 15 Hz (a period of four fields). As described before, the pulse signal f is applied to the reset terminal of the flip-flop 37 on one hand, and is supplied to a stationary control head 46 through the switch SW2 on the other. Thus, the pulse signal f is recorded on the control track 19 which extends along the longitudinal direction of the magnetic tape 12, by the control head 46. The rising edge of the pulse signal d which is produced from the monostable multivibrator 39, may be effectively used to set the flip-flop 37.

At the time of the recording, a pulse signal from a crystal oscillator 47 is frequency-divided by a frequency divider 48 so as to obtain a pulse signal g shown in FIG. 5(G) having a repetition frequency of 30 Hz. This pulse signal g is supplied to a trapezoidal wave generating circuit 49 wherein the pulse signal g is converted into a trapezoidal wave h shown in FIG. 5(H) having a frequency of 30 Hz. The trapezoidal wave h is supplied to a phase comparator 50. At the same time, a rotation detection pulse having a repetition frequency which is dependent on the rotational speed of the capstan 26, is obtained from a capstan pickup head 51 and is supplied to a frequency divider 52. The frequency divider 52 frequency-divides the rotation detection pulse, and produces a pulse signal i shown in FIG. 5(I) having a repetition frequency of 30 Hz. This pulse signal i is supplied to the phase comparator 50 through the switch SW3.

The phase comparator 50 compares the phase of the trapezoidal wave h and the phase of the pulse signal i, and produces an error voltage which is dependent on the phase error between the two signals. This error voltage from the phase comparator 50 is supplied to the capstan motor 27, through an adding circuit 53 and a motor driving amplifier 54, so as to control the rotational speed of the capstan motor 27. The switch SW4 is open during the recording. Hence, no signal is applied to the other input terminal of the adding circuit 53 during the recording. The capstan motor 27 is controlled in this manner so that the capstan 26 rotates at a predetermined rotational speed (in this case, at a rotational speed so as to move the magnetic tape 12 by one track pitch in a duration of one field).

This first embodiment is characterized in that the pulse signal f shown in FIG. 5(F) is generated at the time of the recording. As shown in FIG. 5(F), this pulse signal f has a period of four fields, and the duty cycle thereof changes for every two fields. Therefore, the leading edge of the pulse signal f is used as the control pulse having the frequency of 30 Hz, and the change in the duty cycle is used to discriminate the video heads.

Next, description will be given with respect to the operation of the system at the time of the reproduction. During the reproducing mode, the switches SW1, SW2, and SW3 are switched over and connected to respective terminals P, and the switch SW4 is closed. Accordingly, the output pulse signal g of the frequency divider 48 is frequency-divided by ½ in a frequency divider 55, and the frequency divider 55 produces a pulse signal j shown in FIG. 5(J) having a repetition frequency of 15 Hz. This pulse signal j is supplied to the phase comparator 41 through the switch SW1. Similarly as in the case at the time of the recording, the phase comparator 41 compares the phases of the pulse signal j and the trapezoidal wave which is produced from the pulse signal a. The output of the phase comparator 41 is supplied to the head motor 21 through the mixing amplifier 42. In addition, the output signal of the frequency generator 24 is supplied to the head motor 21 similarly as in the case at the time of the recording. As a result, the rotational speed and the rotational phase of the head motor 21 are controlled and kept constant, and the head motor 21 rotates at a rotational speed of 45 rps.

The video signal is successively reproduced from the video tracks on the magnetic tape 12, by the video heads HA, HB, HC, and HD which are mounted on the rotary body 11 which rotates at the rotational speed of 45 rps. The reproduced video signal is supplied to the recording/reproducing circuit 32. Among the four video heads HA through HD, three of these four video heads HA through HD simultaneously scan over the magnetic tape while the rotary body 11 rotates over the angular range which is slightly greater than 270°. The recording/reproducing circuit 32 performs a specific operation of obtaining the reproduced video signal from only one predetermined video head among these three scanning video heads. This specific operation is successively performed for every rotation of the rotary body 11 over the angular range which is slightly greater than 270°. The reproduced video signal which is obtained from the recording/reproducing circuit 32 in this manner, is converted into a color video signal which is essentially in conformance with the NTSC system by a known method, and is then produced through an output terminal 56.

On the other hand, due to the differential characteristic of the control head 46, the control head 46 reproduces a pulse signal k shown in FIG. 5(K) from the control track 19. This pulse signal k is made up of a positive polarity pulse which corresponds to the rising edge of the pulse signal f, and a negative polarity pulse which corresponds to the trailing edge of the pulse signal f. The pulse signal k is supplied to an amplifier 57 through the switch SW2. The pulse signal k is converted into a pulse signal l shown in FIG. 5(L) in the amplifier 57, and this pulse signal l is supplied to a monostable multivibrator 58. The pulse signal l is also supplied to the phase comparator 50 through the switch SW3. The phase comparator 50 samples and holds the sloping part of the trapezoidal wave h which has the frequency of 30 Hz and is obtained similarly as in the case at the time of the recording, by the positive polarity pulse (control pulse) of the pulse signal l which has the repetition frequency of 30 Hz and is obtained from the amplifier 57. The sampled and held output of the phase comparator 50, is applied to one input terminal of the adding circuit 53.

The monostable multivibrator 58 is designed to be triggered by the trailing edge of the negative polarity pulse of the pulse signal l. The monostable multivibrator 58 produces a pulse signal m shown in FIG. 5(M) having a pulse width $T_1$ and a repetition frequency of 15 Hz, every time the negative polarity pulse of the pulse signal l is supplied thereto. The pulse signal m is supplied to a monostable multivibrator 59 and to one input terminal of an AND circuit 60. The monostable multivibrator 59 is triggered by the trailing edge of the pulse signal m, and produces a pulse signal n shown in FIG. 5(N) having a pulse width $T_2$. This pulse signal n is supplied to the other input terminal of the AND circuit 60. A duration which is a sum of the pulse widths $T_1$ and $T_2$, is selected to a duration which is shorter than a duration of three fields but is greater than a duration of two fields. Accordingly, a pulse signal o shown in FIG. 5(O) is produced from the AND circuit 60. The pulse in the pulse signal o occurs within the duration of one field (one track scanning duration) in which the reproduced output of the video head HA is obtained. The pulse signal o has a repetition frequency of 15 Hz, and a monostable multivibrator 61 is triggered by the leading edge of this pulse signal o.

The monostable multivibrator 61 is triggered and produces a pulse signal p shown in FIG. 5(P) having a pulse width $T_3$. This pulse signal p is converted into a trapezoidal wave q shown in FIG. 5(Q) having a frequency of 45 Hz, in a trapezoidal wave generating circuit 62. The trapezoidal wave q is supplied to a phase comparator 63. The phase comparator 63 obtains a phase error voltage by sampling and holding the sloping part of the trapezoidal wave p with the phase timing of the leading edge (indicated by ta, tb, and tc in FIG. 5(Q)) of the pulse signal j. The pulse signal j is obtained by frequency-dividing the pulse signal g by $\frac{1}{2}$ the $\frac{1}{2}$-frequency divider 55. The phase error voltage produced from the phase comparator 63, is supplied to the adding circuit 53 through the switch SW4. This phase error voltage from the phase comparator 63, is added with the phase error voltage from the phase comparator 50. An added phase error voltage from the adding circuit 53, is supplied to the capstan motor 27 through the motor driving amplifier 54, so as to control the rotational phase of the capstan motor 27. Accordingly, the capstan 26 controls the movement of the magnetic tape 12 so that among the video tracks on the magnetic tape 12, the video tracks recorded by the video head HA are reproduced by the same video head HA. As a result, all of the video tracks on the magnetic tape 12, are reproduced by the same video heads which recorded these video tracks at the time of the recording.

According to this first embodiment, the duty cycle of the control pulse recorded on the control track 19, is alternately changed for every duration of two fields. Further, the difference in the duty cycle of the control pulse, is discriminated from the negative polarity pulse of the pulse signal k which is reproduced by the control head 46. The sloping part of the trapezoidal wave q produced from the negative polarity pulse which is reproduced in the duration of one field in which the video head HD is carrying out the reproduction, is sampled and held by the leading edge of the pulse signal j having the timing which coincides with the point when the video head HA started to carry out the recording, so as to obtained the phase error voltage. This phase error voltage is used to control the rotational phase of the capstan motor 27. Hence, during the reproduction, the phase of the predetermined one video head HA among the four video heads HA through HD, and the phase of the pulses which are recorded on the control track 19 of the magnetic tape 12 and correspond to the video head HA, satisfies a relation of 1:1. Therefore, it is possible to reproduce a video track by the same video head which recorded that video track at the time of the recording.

Figure 6:
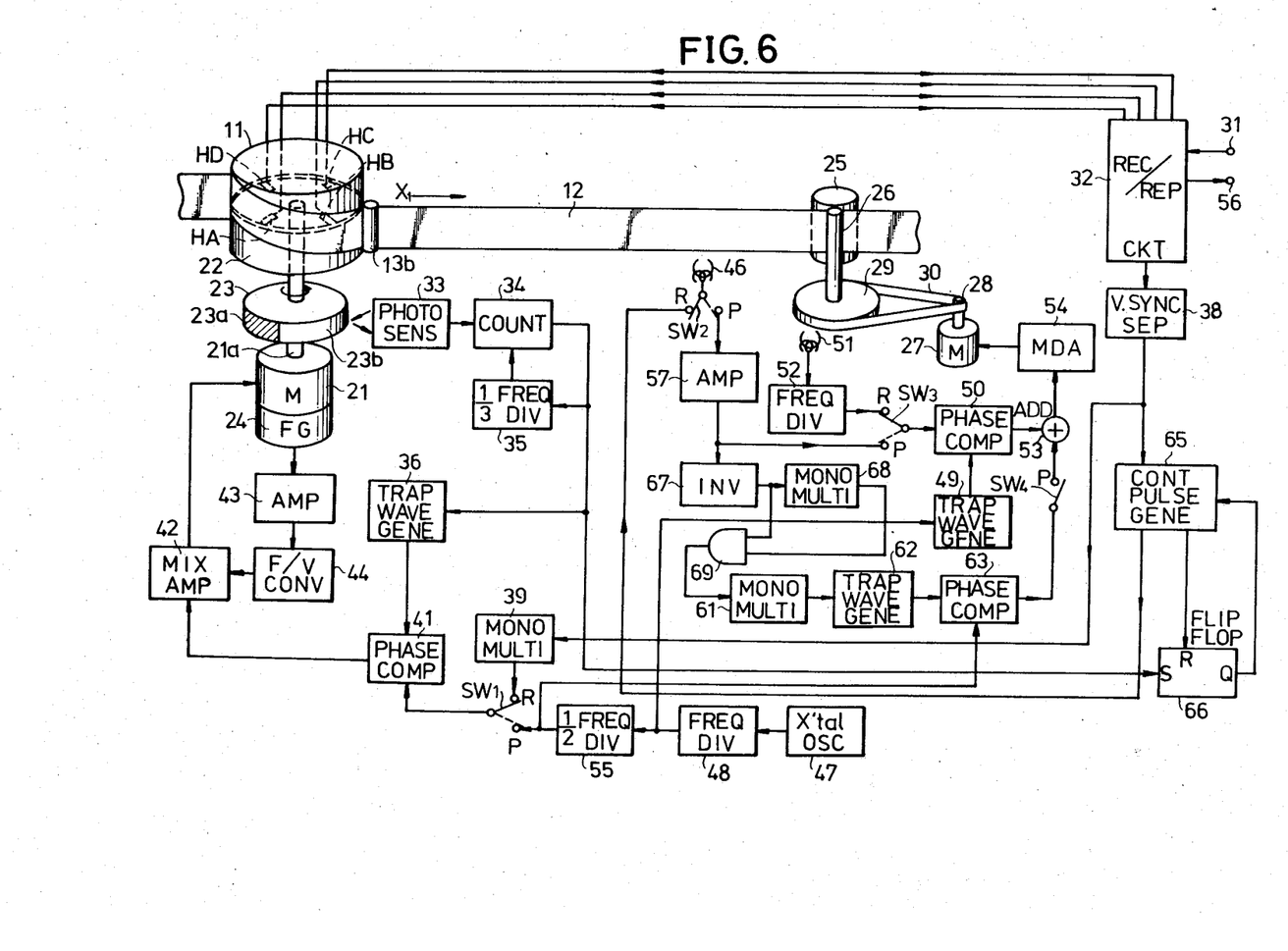
FIG. 6 is a systematic block diagram showing a second embodiment of a recording and/or reproducing system according to the present invention.
Figure 7:
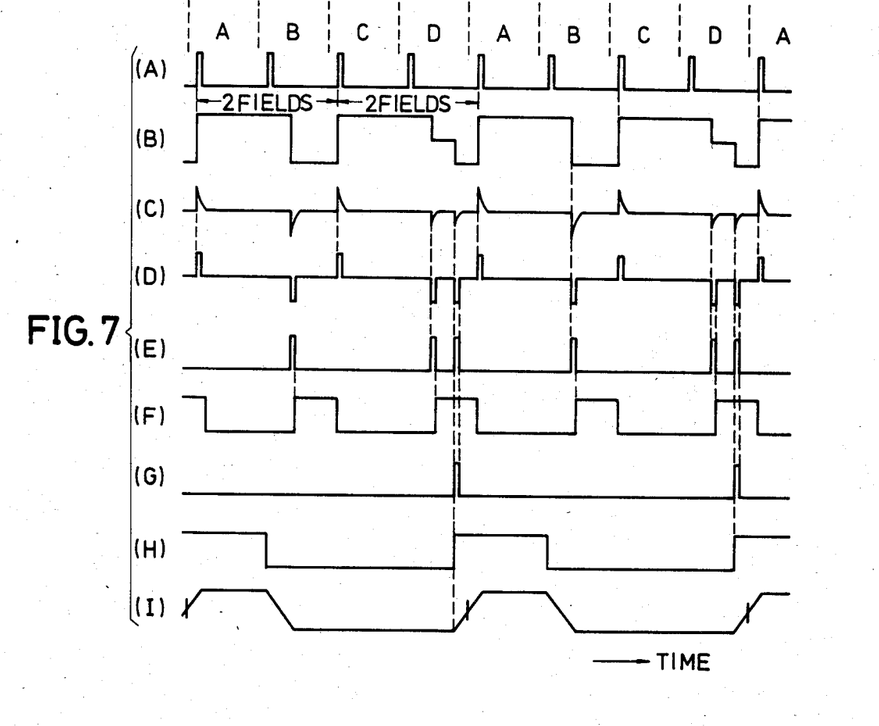

Next, description will be given with respect to a second embodiment of a recording and/or reproducing system according to the present invention, by referring to FIG. 6. In FIG. 6, those parts which are the same as those corresponding parts in FIG. 4 are designated by the same reference numerals, and their description will be omitted. During the recording mode, a vertical synchronizing signal shown in FIG. 7(A) is separated in the vertical synchronizing separating circuit 38. This vertical synchronizing signal is supplied to a control pulse generating circuit 65 wherein the vertical synchronizing signal is subjected to a frequency division and the like. The control pulse generating circuit 65 generates a pulse signal shown in FIG. 7(B) having a period of four fields. As shown in FIG. 7(B), the level of the pulse signal changes in two stages for every duration of two fields. The leading edges of the pulse signal shown in FIG. 7(B) are in phase with the vertical synchronizing signals which are recorded by the video heads HA and HC, and has a repetition frequency of 15 Hz. The pulse signal from the control pulse generating circuit 65 is recorded on the control track by the control head 46. This pulse signal from the control pulse generating circuit 65 is also applied to a reset terminal of a flip-flop 66. The flip-flop 66 is set by the pulse signal from the counter 34, and a Q-output of the flip-flop 66 is supplied to the control pulse generating circuit 65.

During the reproducing mode, the pulse signal shown in FIG. 7(B) which is recorded on the control track, is reproduced as a signal shown in FIG. 7(C). This reproduced signal shown in FIG. 7(C) is supplied to the amplifier 57 wherein the signal is shaped into a pulse signal shown in FIG. 7(D). The output pulse signal of the amplifier 57 is supplied to an inverting circuit 67 wherein only a negative pulse of the pulse signal is inverted. Hence, an output pulse signal of the inverting circuit 67 has a repetition frequency of 15 Hz as shown in FIG. 7(E). As shown in FIG. 7(E), the output pulse signal of the inverting circuit 67 contains one pulse in a duration of one field in which a reproduced signal is obtained from the video head HB, and contains two pulses in a duration of one field in which a reproduced signal is obtained from the video head HD. The output pulse signal of the inverting circuit 67 is supplied to a monostable multivibrator 68, to trigger the monostable multivibrator 68 by the trailing edge thereof. Accordingly, the monostable multivibrator 68 produces a pulse signal shown in FIG. 7(F), and supplies this pulse signal to an AND circuit 69. As shown in FIG. 7(F), the output pulse signal of the monostable multivibrator 68 assumes a high level for a predetermined duration (a duration shorter than a duration of two fields, and longer than an interval between adjacent level changing points when the level of the recorded control pulse changes in two stages) from a time when the monostable multivibrator 68 is triggered.

The AND circuit 69 obtains a logical product of the output pulse signals of the inverting circuit 67 and the monostable multivibrator 68, and produces a pulse signal shown in FIG. 7(G). The pulse signal shown in FIG. 7(G) is in phase with the latter reproduced negative polarity pulse, between the two continuous negative polarity pulses which are separated by an interval shorter than one field, among the reproduced pulses from the control head 46. The output pulse signal of the AND circuit 69 is supplied to the monostable multivibrator 61, to trigger the monostable multivibrator 61 by the leading edge thereof. Hence, a pulse signal shown in FIG. 7(H) is produced from the monostable multivibrator 61, and is supplied to the trapezoidal wave generating circuit 62 which converts this pulse signal into a trapezoidal wave having a repetition frequency of 15 Hz as shown in FIG. 7(I). The trapezoidal wave is supplied to the phase comparator 63, and is subjected to a phase comparison with the pulse signal from the $\frac{1}{2}$-frequency divider having a repetition frequency of 15 Hz.

As a result, during the reproduction, the phase of the predetermined one video head HA among the four video heads HA through HD, and the phase of the pulses which are recorded on the control track 19 of the magnetic tape 12 and correspond to the video head HA, satisfies a relation of 1:1, as in the case of the first embodiment described previously. Therefore, according to this second embodiment, it is possible to reproduce a video track by the same video head which recorded that video track at the time of the recording.

Figure 8:
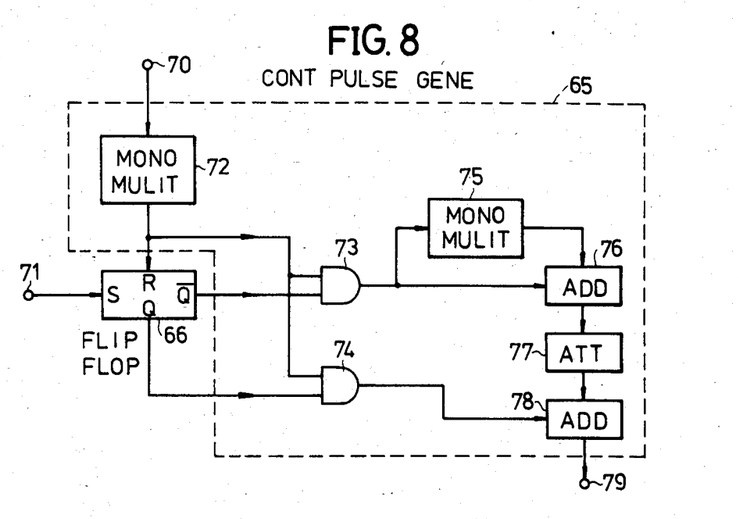
FIG. 8 is a systematic block diagram showing a part of the block system shown in FIG. 6 in more detail.

FIG. 8 shows a concrete circuit construction of the control pulse generating circuit 65 which generates the pulse signal shown in FIG. 7(B). A vertical synchronizing signal shown in FIG. 9(A) from the vertical synchronizing signal separating circuit 38, is applied to a monostable multivibrator 72 within the control pulse generating circuit 65 which is encircled by a phantom line, through a terminal 70. The monostable multivibrator 72 is triggered by this vertical synchronizing signal obtained through the terminal 70. The monostable multivibrator 72 produces a pulse signal shown in FIG. 9(B) having a frequency of 30 Hz, and applies this pulse signal to a reset terminal R of the flip-flop 66. The pulse signal from the monostable multivibrator 72 is also supplied to one input terminal of an AND-gate 73, and to one input terminal of an AND-gate 74. A pulse signal shown in FIG. 9(C) which is obtained from the counter 34 and has a frequency of 15 Hz, is applied to a set terminal S of the flip-flop 66 through a terminal 71. A Q-output of the flip-flop 66 shown in FIG. 9(D) is applied to the other input terminal of the AND-gate 74, and a $\bar{Q}$-output of the flip-flop 66 shown in FIG. 9(E) is applied to the other input terminal of the AND-gate 73.

Figure 9:
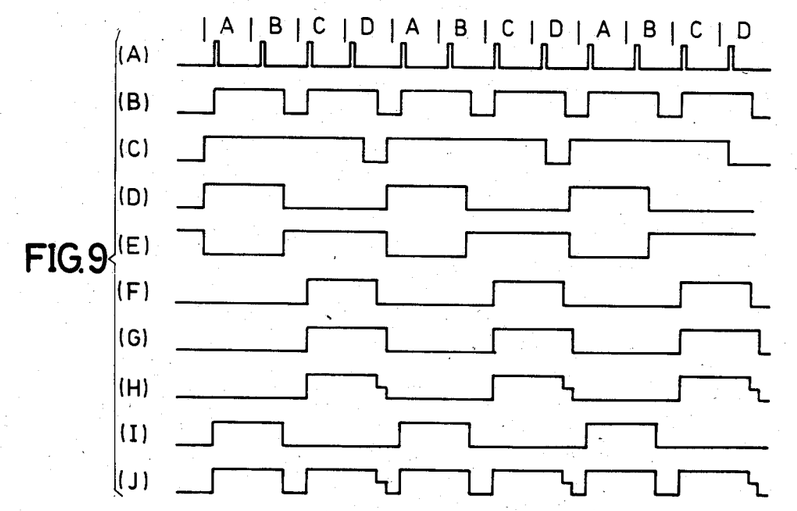

A pulse signal shown in FIG. 9(F) which is in phase with the video head HC and has the same timing as the vertical synchronizing signal, is obtained from the AND-gate 73. This output pulse signal of the AND-gate 73 is supplied to a monostable multivibrator 75 which produces a pulse signal shown in FIG. 9(G) having a pulse width greater than the pulse width of the pulse signal shown in FIG. 9(F). The output pulse signal of the AND-gate 73 shown in FIG. 9(F) and the output pulse signal of the monostable multivibrator 75 shown in FIG. 9(G), are added in an adder 76. An output signal of the adder 76 is attenuated by ½ in an attenuator 77. As a result, a pulse signal shown in FIG. 9(H) is supplied to an adder 78. On the other hand, a pulse signal shown in FIG. 9(I) is obtained from the AND-gate 74, and is supplied to the adder 78. Thus, the adder 78 adds the pulse signal shown in FIG. 9(H) and the pulse signal shown in FIG. 9(I), and produces a pulse signal shown in FIG. 9(J). The pulse signal shown in FIG. 9(J) is the same as the pulse signal shown in FIG. 7(B), and this pulse signal shown in FIG. 9(J) is supplied to the switch SW2 through a terminal 79.

Figure 10:
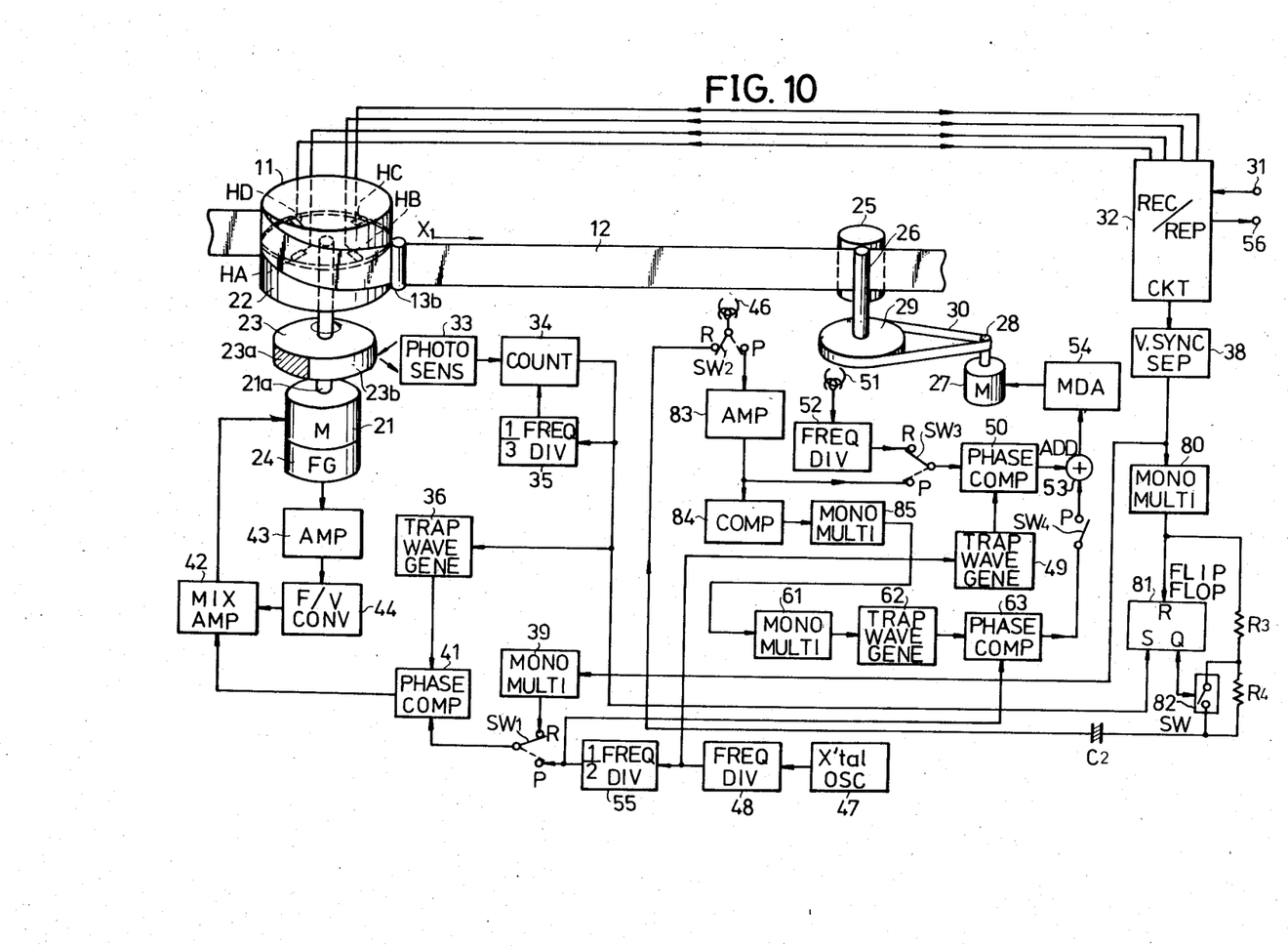
FIG. 10 is a systematic block diagram showing a third embodiment of a recording and/or reproducing system according to the present invention.
Figure 11:
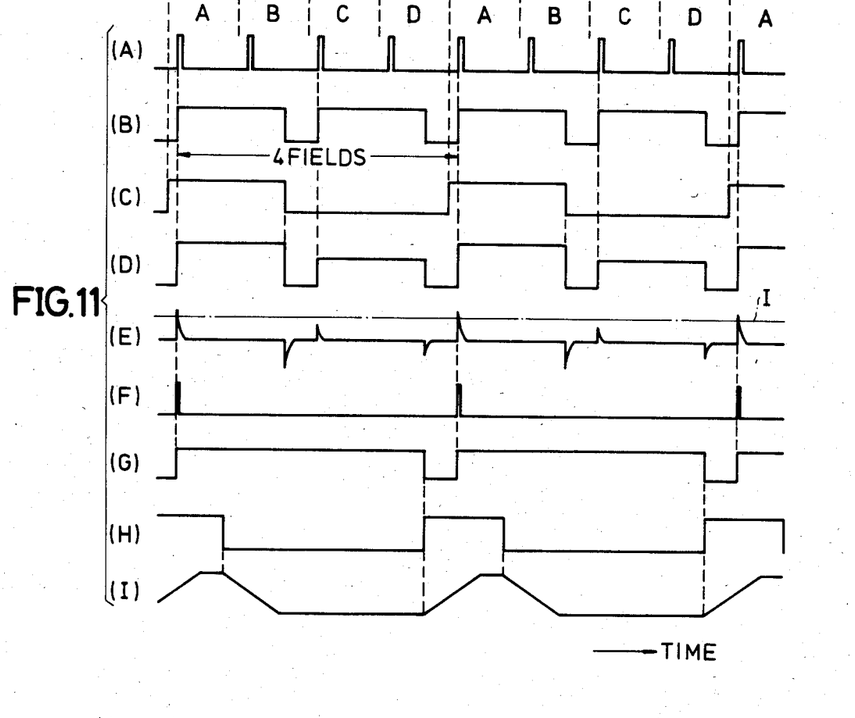

Next, description will be given with respect to a third embodiment of a recording and/or reproducing system according to the present invention, by referring to FIG. 10. In FIG. 10, those parts which are the same as those corresponding parts in FIGS. 4 and 6 are designated by the same reference numerals, and their description will be omitted. During the recording mode, a vertical synchronizing signal shown in FIG. 11(A) is obtained from the vertical synchronizing signal separating circuit 38. This vertical synchronizing signal is supplied to a monostable multivibrator 80 wherein the vertical synchronizing signal is frequency-divided by ½ and is converted into a pulse signal shown in FIG. 11(B) having a repetition frequency of 30 Hz (a period of two fields). The output pulse signal of the monostable multivibrator 80 is applied to a reset terminal of a flip-flop 81, and resets the flip-flop 81 by the leading edge thereof. The output pulse signal of the monostable multivibrator 80 is also supplied to the control head 46, through a circuit comprising resistors R3 and R4 and a capacitor C2 which are coupled in series and the switch SW2.

The flip-flop 81 is set by the leading edge of the pulse signal from the counter 34 having the repetition frequency of 15 Hz. Accordingly, the flip-flop 81 produces a square wave signal shown in FIG. 11(C) having a period of four fields. The output signal of the flip-flop 81 turns ON a switching circuit 82 which is coupled in parallel to the resistor R4, and short-circuits both terminals of the resistor R4, in a high-level duration (a duration shorter than two fields) thereof. On the other hand, the output signal of the flip-flop 81 turns OFF the switching circuit 82, in a low-level duration thereof. Hence, in the low-level duration of the output signal of the flip-flop 81, the output signal current of the monostable multivibrator 80 becomes limited compared to the high-level duration of the output signal of the flip-flop 80, by a quantity corresponding to the resistors R3 and R4 which are coupled in series. As a result, the output signal current of the monostable multivibrator 80 assumes a square waveform shown in FIG. 11(D) having a period of four fields. As shown in FIG. 11(D), the peak value of this signal current alternately changes with a period of two fields. The output signal current of the monostable multivibrator 80 is supplied to the control head 46, and is recorded on the control track by the control head 46. The the leading edge of the signal current shown in FIG. 11(D) which is supplied to the control head 46, has a period of 1/30 second, and is in phase with the vertical synchronizing signal. In other words, the period of the leading edge of the signal current shown in FIG. 11(D), has the same period as the conventional control pulse. Thus, the leading edge of the signal current shown in FIG. 11(D) is recorded and reproduced as the control pulse. The peak value of the signal current shown in FIG. 11(D), which alternately changes with a period of two fields, is recorded and reproduced as a video head discriminating information.

During the reproducing mode, the recorded pulse signal (FIG. 11(D)) on the control track is reproduced by the control head 46 as a pulse signal shown in FIG. 11(E). The peak value of this reproduced pulse signal corresponds to the peak value of the recorded control pulse. The reproduced pulse signal from the control head 46, is linearly amplified in an amplifier 83. An output signal of the amplifier 83 is supplied to a comparator 84 wherein the signal level is compared with a threshold level indicated by a one-dot chain line in FIG. 11(E). The comparator 84 produces a pulse signal shown in FIG. 11(F) having a period of four fields. The pulse signal shown in FIG. 11(F) is produced at a point which substantially coincides with the phase with which the leading edge of the control pulse having the larger peak value is reproduced. The output pulse signal of the comparator 84 is supplied to a monostable multivibrator 85, to trigger the monostable multivibrator 85 by the leading edge thereof, for example. Accordingly, the monostable multivibrator 85 produces a pulse signal shown in FIG. 11(G) having a period of four fields and having a pulse width which is smaller than four fields but is larger than three fields. The output pulse signal of the monostable multivibrator 85 is applied to the monostable multivibrator 61 in the subsequent stage, to trigger the monostable multivibrator 61 by the trailing edge thereof.

Therefore, the monostable multivibrator 61 produces a pulse signal shown in FIG. 11(H). The leading edge of the pulse signal shown in FIG. 11(H) occurs at a point in a latter half of the duration of one field in which the reproduced signal is obtained from the video head HD, and the trailing edge occurs within a subsequent duration of one field in which the reproduced signal is obtained from the video head HA. The output pulse signal of the monostable multivibrator 61 is converted into a trapezoidal wave shown in FIG. 11(I) in the trapezoidal wave generating circuit 62, and this trapezoidal wave is supplied to the phase comparator 63.

Therefore, according to this third embodiment, it is possible to reproduce a video track by the same video head which recorded that video track at the time of the recording.

In each of the embodiments described heretofore, the video head discriminating information is recorded on the control track 19 on the magnetic tape 12. However, only the leading edge of the recorded control pulse having the period of 1/30 second, is used as the control pulse in the existing 2-head type VTR. For this reason, no problems will be introduced and the control pulse can be reproduced satisfactorily even when this magnetic tape 12 is played on the existing 2-head type VTR.

In the embodiments described heretofore, the video head discriminating information is recorded on the control track 19 on the magnetic tape 12, as a change in the duty cycle of the control pulse, as the existence of a level change of the control pulse in stages, or as a change in the peak value of the control pulse. However, this video head discriminating information may be recorded on and reproduced from other parts of the magnetic tape 12. Further, the present invention may be applied to an apparatus which records and reproduces two fields or a natural number multiple of two fields of the composite video signal with respect to one video track.

In the embodiments, it was described that the video signal being recorded and reproduced has a field frequency of 60 Hz (or 59.94 Hz). However, the present invention may also be applied to the recording and reproduction of a video signal having a field frequency of 50 Hz. In addition, in the embodiments described heretofore, a pulse which is formed from the output signal of the oscillator 47, is used as the reference signal for the phase control loop of the head servo circuit during the reproduction. This means that the phase of the trapezoidal wave in synchronism with the rotational phase of the rotary body 11, is indirectly compared with the phase of the reproduced control pulse. However, the reproduced control pulse from the control head 46 may be used as the reference signal for the phase control loop, so as to indirectly compare the phase of the above trapezoidal wave and the phase of the reproduced control pulse. In this case, the repetition frequency of the reproduced control pulse may be the same as or ½ the frequency of the vertical synchronizing signal, and the reproduced control pulse may be frequency-divided to the same repetition frequency as the above trapezoidal wave. The trapezoidal wave generating circuit 62 may be provided in the output stage of the ½-frequency divider 55.

Further, the present invention is not limited to these embodiments, but various variations and modifications may be made without departing from the scope of the present invention.

What is claimed is:

1. A recording and/or reproducing system for a 4-head type recording and/or reproducing apparatus, said recording and/or reproducing apparatus comprising a rotary body having an outer peripheral surface to which a magnetic tape is wrapped around over an angular range which is slightly greater than 270°, a first motor for rotating said rotary body, four magnetic heads for successively recording and/or reproducing essentially one field of a video signal on and/or from one track on said magnetic tape, said four magnetic heads being made up of first and second pairs of magnetic heads, said first pair of magnetic heads having gaps of the same azimuth angle and being mounted at diametrical positions on said rotary body, said second pair of magnetic heads having gaps of the same azimuth angle which is different from the azimuth angle of the gaps of said first pair of magnetic heads, and being mounted at diametrical positions on said rotary body with an angular separation of 90° from the respective magnetic heads of said first pair, a capstan for moving said magnetic tape, a second motor for rotating said capstan, and a control head for recording and/or reproducing a control signal on said magnetic tape, said recording and/or reproducing system comprising:

first rotation detecting means for detecting a rotation of said rotary body which is rotated by said first motor, and for producing a detection signal in synchronism with a rotational phase of said rotary body;

frequency dividing means for frequency-dividing the output detection signal of said first rotation detecting means so that a frequency thereof becomes equal to ⅛ a field frequency of said video signal;

separating means for separating a vertical synchronizing signal from said video signal;

control and head discriminating signals generating means supplied with an output frequency divided signal from said frequency dividing means and the separated vertical synchronizing signal from said separating means, for generating a control signal in phase with said vertical synchronizing signal and a head discriminating signal having a period of four fields, said control signal and said head discriminating signal generated from said control and head discriminating signals generating means being supplied to said control head to be recorded on said magnetic tape and be reproduced from said magnetic tape;

second rotation detecting means for detecting a rotation of said capstan which is rotated by said second motor, and for producing a detection signal;

oscillator means for producing a signal having a constant frequency;

first phase comparing means for comparing the phase of the output detection signal of said second rotation detecting means and the phase of an output signal of said oscillator means during a recording mode of said recording and/or reproducing apparatus in which the video signal successively recorded on said magnetic tape by said magnetic heads, and for comparing the phase of a control signal which is reproduced from said magnetic tape by said control head and the phase of the output signal of said oscillator means during a reproducing mode of said recording and/or reproducing apparatus in which the video signal is successively reproduced from said magnetic tape by said magnetic heads;

obtaining means for obtaining said head discriminating signal from a signal which is reproduced from said magnetic tape by said control head;

second phase comparing means for comparing the phase of said head discriminating signal from said obtaining means and the phase of the output signal of said oscillator means having the period of four fields;

first rotation controlling means for applying to said second motor an output signal of said first phase comparing means during the recording mode, and for applying to said second motor an added signal obtained by adding the output signal of said first phase comparing means and an output signal of said second phase comparing means during the reproducing mode, so as to control the rotation of said second motor;

third phase comparing means for comparing the phase of the output signal of said frequency dividing means and the phase of a signal obtained from the separated vertical synchronizing signal during the recording mode, and for comparing the phase of a signal from said frequency dividing means and the phase of the output signal of said oscillator means during the reproducing mode; and second rotation controlling means for applying an output signal of said third phase comparing means to said first motor, so as to control the rotation of said first motor.

2. A recording and/or reproducing system as claimed in claim 1 in which said control and head discriminating signals generating means generates a pulse signal having a period of four fields and having a duty cycle which alternately changes for every duration of two fields, as said control signal and said head discriminating signal, a signal part of said pulse signal having a period of two fields being used as said control signal, another signal part of said pulse signal having a period of four fields being used as said head discriminating signal.

3. A recording and/or reproducing system as claimed in claim 2 in which said control and head discriminating signals generating means comprises a monostable multivibrator triggered by the vertical synchronizing signal from said separating means, said monostable multivibrator having a time constant circuit, a flip-flop reset by an output signal of said monostable multivibrator and set by the frequency divided signal from said frequency dividing means, and means for switching a time constant of said time constant circuit by an output signal of said flip-flop circuit.

4. A recording and/or reproducing system as claimed in claim 1 in which said control and head discriminating signals generating means generates a pulse signal having a period of four fields and having a signal part which changes the level in a plurality of stages for every duration of two fields, as said control signal and said head discriminating signal, said signal part of said pulse signal having a period of two fields being used as said control signal, another signal part of said pulse signal having a period of four fields being used as said head discriminating signal.

5. A recording and/or reproducing system as claimed in claim 4 in which said control and head discriminating signals generating means comprises a control pulse generating circuit for generating a control pulse having a period of two fields, and a flip-flop reset by an output of said control pulse generating circuit and set by the output of said frequency dividing means, said control pulse generating circuit being controlled by an output of said flip-flop so that the level of the output of said control pulse generating circuit changes in a plurality of stages for every duration of two fields, said output of said control pulse generating circuit being supplied to said control head.

6. A recording and/or reproducing system as claimed in claim 1 in which said control and head discriminating signals generating means generates a pulse signal having a period of four fields and having a peak value which alternately changes for every duration of two fields, as said control signal and said head discriminating signal, a signal part of said pulse signal having a period of two fields being used as said control signal, another signal part of said pulse signal having a period of four fields being used as said head discriminating signal.

7. A recording and/or reproducing system as claimed in claim 6 in which said control and head discriminating signals generating means comprises a monostable multivibrator triggered by the vertical synchronizing signal from said separating means, a flip-flop reset by an output of said monostable multivibrator and reset by the output of said frequency dividing means, and switching means for switching the peak value of the output signal of said monostable multivibrator responsive to an output of said flip-flop, the output of said monostable multivibrator switched of its peak value by said switching means being supplied to said control head.

* * * * *